United States Patent [19]
Palmer et al.

[11] 4,307,933
[45] Dec. 29, 1981

[54] OPTICAL FIBER LAUNCH COUPLER

[75] Inventors: John P. Palmer, Pomona; Phillip B. Ward, Jr., Brea, both of Calif.

[73] Assignee: General Dynamics, Pomona Division, Pomona, Calif.

[21] Appl. No.: 123,034

[22] Filed: Feb. 20, 1980

[51] Int. Cl.³ .............................................. G02B 5/172
[52] U.S. Cl. ................. 350/96.16; 156/153; 350/96.15
[58] Field of Search .............. 350/96.15, 96.16, 96.30, 350/320; 65/4 B, 61; 51/283 R; 156/153, 154

[56] References Cited

U.S. PATENT DOCUMENTS

| | | | |
|---|---|---|---|
| 2,541,912 | 2/1951 | Broughton | 106/281 |
| 2,992,956 | 7/1961 | Bazinet, Jr. | 156/73.2 |
| 2,995,970 | 8/1961 | Hicks, Jr. et al. | 65/23 |
| 3,064,391 | 11/1962 | Devol | 65/45 |
| 3,406,358 | 10/1968 | Seidel et al. | 333/150 |
| 3,421,957 | 1/1969 | Kwapisz | 156/153 |
| 3,455,668 | 7/1969 | Upton | 65/38 |
| 3,567,547 | 3/1971 | Mattson et al. | 156/247 |
| 3,868,794 | 3/1975 | Zitkus | 51/216 A |
| 3,933,410 | 1/1976 | Milton | 350/96.16 |
| 4,008,061 | 2/1977 | Ramsay | 65/4 A |
| 4,021,097 | 5/1977 | McMahon | 350/96.15 |
| 4,054,366 | 10/1977 | Barnoski et al. | 350/96.15 |
| 4,087,156 | 5/1978 | Kao et al. | 350/96.21 |
| 4,089,583 | 5/1978 | Auracher et al. | 350/96.15 |
| 4,089,584 | 5/1978 | Polczynski | 350/96.16 |
| 4,102,579 | 7/1978 | Stewart | 356/201 |
| 4,103,154 | 7/1978 | d'Auria et al. | 350/96.15 X |
| 4,134,640 | 1/1979 | Auracher et al. | 350/96.15 |
| 4,135,780 | 1/1979 | Dyott | 350/96.15 |
| 4,136,929 | 1/1979 | Suzaki | 350/96.15 |
| 4,142,877 | 3/1979 | Auracher et al. | 65/4 B |

FOREIGN PATENT DOCUMENTS

| | | | |
|---|---|---|---|
| 52-24539 | 2/1977 | Japan | 350/96.15 |
| 54-118255 | 9/1979 | Japan | 350/96.15 |

OTHER PUBLICATIONS

Teh et al., "Coupling From a Thin Film to an Optical Fiber", *Applied Optics*, vol. 17, No. 16, Aug. 1978, pp. 2483–2484.

Tsujimoto et al., "Fabrication of Low-Loss 3 db Couplers With Multimode Optical Fibers", *Electronics L.*, vol. 14, No. 5, Mar. 1978, pp. 157–158.

*Primary Examiner*—John D. Lee
*Attorney, Agent, or Firm*—Henry M. Bissell; Edward B. Johnson

[57] ABSTRACT

A low-loss unidirectional optical coupler utilizing clad monofilament fibers of different diameters is provided by mounting each fiber on a curved surface, lapping the smaller (launch) fiber substantially tangentially to the curved surface until the core of the launch fiber has been lapped through to produce two elliptical flat surfaces, independently lapping the other (throughput) fiber tangentially to its surface to produce a fiber surface of substantially the same size as one of those produced on the launch fiber, aligning the throughput fiber surface with one of the launch fiber surfaces, and bonding them together.

26 Claims, 9 Drawing Figures

OPTICAL FIBER LAUNCH COUPLER

BACKGROUND OF THE INVENTION

1. Field of the Invention.

The present invention relates to unidirectional optical fiber couplers, and more particularly to an improved fiber optic launch coupler in which transmission from the launch fiber to the throughput fiber is almost complete while loss of transmission through the throughput fiber is minimal.

2. Description of the Prior Art.

The use of optical fibers, or light tubes, has progressed from laboratory curiosity to sophisticated optical communications and data transmission systems. The fibers function by transmitting light longitudinally along a flexible axis and are made of various materials having differing properties which are selected for specific uses. Many different procedures and structures are used to produce couplers which join and separate light carried in different fibers. In producing the couplers, there is a basic distinction between unidirectional and bidirectional couplers. The unidirectional launch couplers are 3-port couplers having optical fiber connections at each port. One of these ports (No. 1) is the entrance to the launch fiber, and the other two ports (Nos. 2 and 3) are opposite ends of a common fiber called the throughput fiber. The unidirectional launch couplers are designed to launch optical signals into the throughput fiber, in one direction only, without causing attenuation, or other types of disturbance, of optical signals propagating in either direction in the throughput fiber. In other words, the unidirectional launch couplers are designed so that light entering either port No. 1 or port No. 2 exits only from port No. 3, and light entering port No. 3 exits only from port No. 2. In contrast to the unidirectional launch coupler, the bidirectional coupler is a 4-port coupler in which light entering either port No. 1 or port No. 2 exits from both port No. 3 and port No. 4, and light entering port No. 3 or port No. 4 exits from port No. 1 and port No. 2.

One major use of the couplers is computer control systems where sophisticated data distribution networks are employed. Some of the advantages of the use of fiber optic systems include high bandwidths, immunity to radio and other electromagnetic interference with the signal, lower weight and volume and potentially lower costs. In order to provide optical fiber communication between various computer sections, for example, the above couplers are necessary. Many different types of couplers have been suggested in the prior art, including those disclosed in applicant's copending applications Ser. Nos. 15,026 and 15,027, both filed on Feb. 26, 1979, and assigned to the assignee of the present invention.

In addition, many other methods of obtaining the necessary light transmission have been described in the prior art. For instance, U.S. Pat. Nos. 4,134,640 and 4,142,877, both to Auracher et al., describe the use of rectangular or square cross-section, solid, unidirectional couplers. U.S. Pat. No. 4,087,156 of Kao et al. describes another system wherein the fiber cladding is removed, and a plurality of fibers are encapsulated in a matching or slightly higher refractive index material. The fibers in Kao et al. do not touch each other. These types of structures have losses due to changes in the characteristics of the material and the larger area utilized for the light transfer, which results in signal loss.

Alternatively, it has been suggested that a unidirectional coupler be formed by using three fibers and inserts which are drawn down by heating the fibers and stretching them. This type of system is disclosed in U.S. Pat. No. 4,008,061 to Ramsay. Other specific structures are disclosed in U.S. Pat. No. 3,933,410 to Milton and 4,021,097 to McMahon. Both of these allow the launch fiber to conduct light past the interface with the throughput fiber in the manner of a 4-port, bidirectional coupler, and transfer efficiency suffers as a result.

The Milton reference, noted above, discloses the use of epoxy resins to bond the fibers in couplers, and as such the resins are well known in the art. Additionally, the art suggests the use of lasers to fuse the fibers. Exemplary disclosures are found in U.S. Pat. No. 4,054,366 to Barnoski et al. and in "Coupling From Thin Film to an Optical Fiber" by G. A. Teh and G. I. Stegman in the Aug. 15, 1978 issue of Applied Optic, Vol. 17 No. 16. The fusion system suggested in these references can have problems when a glass clad fiber is utilized, in which the cladding and fiber have different melting points.

Suzaki in U.S. Pat. No. 4,136,929 suggests the use of two equal-diameter glass fibers which are bent to an arcuate shape, cut, polished and attached in a face-to-face relationship on the polished surfaces. The suggested structure is a bidirectional coupler, and will not transfer all of light from the launch (input) side to the throughput (transmission) side. It is this particular problem, that is the efficient transfer from a launch fiber to a throughput fiber, to which the present invention is directed. In particular, the present invention undertakes to improve upon unidirectional launch couplers by producing coupling efficiency up to about 99%, and throughput efficiency of about 99.8%. The present invention is directed to overcoming the prior art bidirectional coupler problem where 50% of the light being transmitted is passed on through the launch fiber, and 50% is transmitted to the throughput fiber. Also, the invention is directed to alleviating the problem of the coupling itself being so inefficient that significant light is lost due to structural considerations.

SUMMARY OF THE INVENTION

The structure of the present invention is a unidirectional launch coupler having two input ports and one output port. One of the input ports and the output port constitute a throughput fiber. They are formed of continuous, single-strand, optical light-tube fibers. The second input port is formed of a different single-strand fiber of significantly smaller diameter than the throughput fiber, and terminates at the junction with the throughput fiber.

In order to produce the unidirectional coupler of the present invention, both fibers (which are normally single-strand glass-clad glass fibers known in the art, such as the Galite 3000 or Galite 3000LC (large core) fiber) can be mounted on preselected curved surfaces by the use of a resin adhesive, such as one of the epoxy resins. "Galite" is believed to be a registered trademark of Galileo Electro-Optics, Inc. The throughput fiber has a flat surface of a preselected surface area lapped onto it, which lapping goes through the outer glass cladding. The particular characteristics of the surface, after lapping, will be discussed below.

The smaller, launch fiber, normally up to 100, usually 5 to 70, microns in core diameter is also epoxy mounted on an arcuate surface and lapped. The lapping of the launch fiber, however, is effected to the point that the core of the launch fiber is completely severed. The thickness of the smaller launch fiber and the radius of curvature of the arcuate surface on which it is mounted will develop a specific elliptical flat surface area which has been selected to provide the desired coupling.

The two lapped surfaces are mounted together, so that one exposed core section of the severed launch fiber comes into direct contact with the exposed core surface of the larger throughput fiber. The lapping of the larger throughput fiber is effected in a manner that produces an exposed flat surface, again of elliptical shape, which has a surface area equal to the surface area of one of the severed faces of the smaller launch fiber. The importance of these characteristics must be emphasized, as it is the matching of these two surfaces which produces the improvement of the present invention. That is, the severance of the launch fiber results in all of the light transmitted therein being exposed at the elliptical surface, and thus, being transferable to the throughput fiber. The transfer occurs at differing points due to the curvature and the elliptical shape of the fiber. In the alternative, the small flat surface cut in the throughput fiber results in minimum loss of transmitted light across the throughput fiber itself. The units are then connected so the transfer occurs only across one end of the launch fiber. That is, once completed, only one of the two exposed sections of the launch fiber would receive light from the throughput fiber or transmit light to it.

After lapping and polishing to form the above structures, the units are assembled so that two exposed surfaces are matched, that is, the exposed core of the throughput fiber comes in contact with one of the core sections of the launch fiber, and they are adhered together utilizing an optically transparent epoxy resin. When this is done the two curved surface fiber retainers which hold the fibers in the arcuate positions would be spaced off center so that the flat regions are in full contact. This results in the second of the two flat regions on the launch fiber being away from the contact surface. The resulting structure is a unidirectional coupler.

The removal of such a small amount of glass material from the throughput fiber greatly improves the efficiency of the coupler. It is possible to remove such a small amount in view of the fact that the small diameter of the launch fiber results in a small coupling surface, which allows for the removal of a small amount of material from the throughput fiber. In units constructed in accordance with the invention, optical signals initiated at either end of the throughput fiber are transmitted to the opposite end with nearly identical intensity, and only a very small signal exits to the launch fiber. However, when an optical signal is placed in the launch fiber, almost all of the signal is transferred to the downstream end of the throughput fiber. More specifically, the throughput loss in one device has been determined to be approximately 0.01dB, corresponding to a loss of about 0.23% of the signal transmitted. On the other hand when coupling is effected, the insertion loss is approximately 1.5dB, corresponding to approximately 29% of the signal being launched. Losses down to about 1dB or 10%, are possible utilizing the present structure.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

Figure 1:
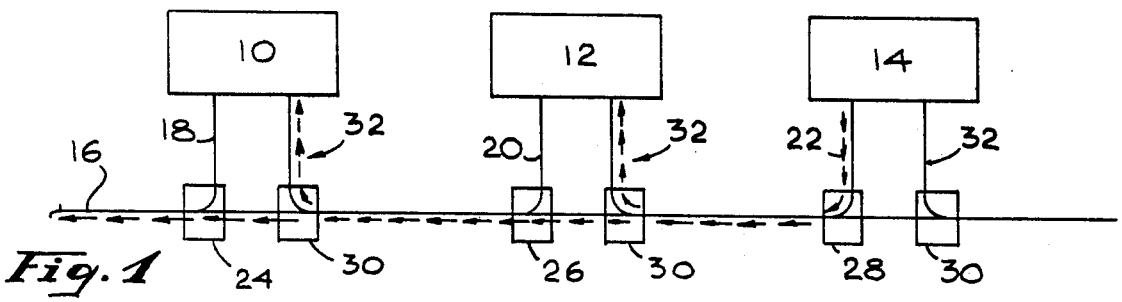
FIG. 1 is a block diagram of part of a circuit utilizing unidirectional couplers.

The launch couplers of the present invention can be utilized in a system as shown in FIG. 1 which shows terminals 10, 12 and 14 connected to bus line 16 through transmission lines 18, 20 and 22 and launch couplers 24, 26 and 28, respectively. Additionally, bus line 16 communicates with terminals 10, 12 and 14 through tap couplers 30 and lines 32. In this case, the tap coupler's ratio of transmitted signal intensity to throughput signal intensity is adjusted independent of the launch coupler efficiency. For example, the tap couplers may tap off 10% of the available optical signal, while the launch couplers would launch 95% of the available optical signal into bus line 16. It should be noted that transmission from terminal 10 through line 18 and tap coupler 24 into bus line 16 would not provide for the communication of the optical signal to either terminal 12 or terminal 14, while transmissions from terminal 14 through line 22 and launch coupler 28 would communicate directly to terminals 10 and 12. Therefore, in a more complete circuit, bus line 16 would be one of two parallel bus lines, which transmit in opposite directions.

Figure 2:
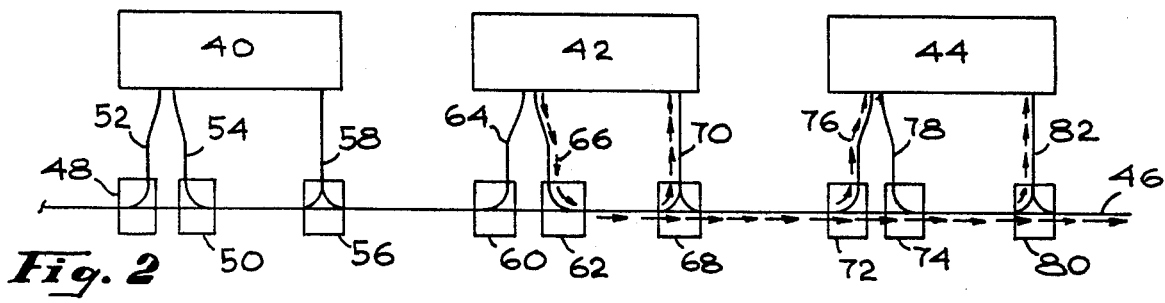
FIG. 2 is a block diagram of a circuit utilizing both unidirectional couplers and bidirectional couplers.

If two parallel bus lines are not appropriate in the circuitry in FIG. 1, the system illustrated in FIG. 2 may be utilized. In FIG. 2, terminals 40, 42 and 44 are each coupled with bus line 46 through a pair of unidirectional launch couplers and a bidirectional tap coupler. Terminal 40 utilizes launch couplers 48 and 50 through lines 52 and 54 to communicate with bus line 46. Launch couplers 48 and 50 would be of the type manufactured in accordance with the present invention. Signals are transmitted to terminal 40 through bidirectional tap coupler 56 and line 58. Likewise, terminal 42 has unidirectional launch couplers 60 and 62 connected by lines 64 and 66, and tap coupler 68 connected by line 70. Terminal 44, in the same manner, utilizes launch couplers 72 and 74 connected through lines 76 and 78, and tap coupler 80 connected through line 82. In operation, as shown by the arrows in FIG. 2, a signal can be generated in terminal 42 and would traverse line 66, enter launch coupler 62, and be provided to bus line 46. Tap coupler 68 would then tap part of the signal off bus line 46 and transmit it back to terminal 42 via line 70. The signal would be directed to terminal 44 through line 82 and coupler 80. In addition a small amount of signal would be transmitted to terminal 44 through launch coupler 72 and line 76.

Further, transmission in a direction opposite from the arrows shown in FIG. 2, i.e., from terminal 44 through line 76 and into launch coupler 72 would be transmitted through bus line 46 to tap coupler 68 and from there through line 70 to terminal 42. In addition a small amount of signal would be transferred through launch coupler 62 and line 66 to terminal 42, and further the signal would be transferred through tap coupler 56 and line 58 to terminal 40.

Both of the above systems are adaptable for use with the launch couplers of the present invention. In FIG. 1 the launch couplers of the present invention would be utilizable as couplers at 24, 26 and 28, while in FIG. 2, the couplers utilized at 48 and 50, 60 and 62, and 72 and 74 could be those made in accordance with the present invention. As noted above, the throughput through bus lines 16 and 46 would function with almost no loss, and thus the launch couplers of the present invention would maximize the amount of signal traversing the bus line without great loss through the launch coupler when the signal crosses the coupler in a direction opposite that intended for the launching function. However, when a signal is generated in a terminal, and transmitted toward the bus line, the launch couplers of the present invention would result in 95% transmission to the bus line, and thus very efficient operation.

In the launch couplers of the present invention, two separate single-strand glass fibers are utilized. The throughput fiber, which is the fiber utilized in the bus line, is of greater core diameter than the launch fiber. In particular, the throughput fiber core diameter may vary from 100 to 400 microns, preferably from about 125 to about 250 microns. Launch fibers of up to 100 microns, preferably from about 5 to 70 microns, are also used. It should be noted that when speaking of these sizes, the core diameter is the size specified. Generally, a glass-clad glass fiber is utilized, and the cladding size would not be considered in selecting the fiber size to be used to practice the invention. Further, the particular size of the two fibers would be determined by other design characteristics, such as the number of terminals to be utilized, signal loss over distance, and other factors. Limitations on the launch fiber size generally depend upon other factors such as the technology in use. Thus, the launch fiber must be large enough to transmit the proper signal over the fiber line to the terminal and would generally be limited to about 5 microns for a minimum core diameter. The upper limit on the launch fiber diameter would be controlled by the desired size ratio to practice the present invention. In particular, the ratio of the diameters of the core diameter of the throughput fiber to the launch fiber core diameter should be in the range of from 3:2 to 4:1, and is preferably in the range of 1.6:1 to 2.4:1. The optimum range, for maximum effectiveness is 2:1.

The type of coating is not critical to the process or product of the present invention, but the process is limited to coatings which would remain after the lapping and joining in accordance with the present invention. Many commercially available single-strand optical fibers have a nylon buffer coating which is often stripped during coupler preparation and the resulting couplers are too fragile. In the process of the present invention, there is no need for stripping of the protective coating or the removal of the normal glass cladding, as the lapping step removes all unnecessary extraneous components. In addition, in the process of the present invention the small amount of light that is coupled to the glass cladding of the fibers functions as a cylindrical wave guide and can still be coupled to the throughput fiber in the launch coupler. Thus, the efficiency of the system is further improved.

Figure 3:
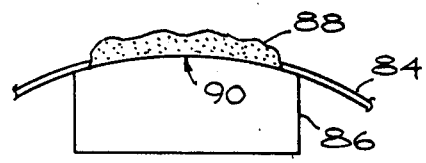
FIG. 3 is a side view of a mounted fiber before lapping and polishing.

After the selection of the desired diameter optical fiber, fiber 84, as shown in FIG. 3, is attached to arcuate block 86 utilizing epoxy resin 88. The size of fiber 84, and the desired eventual structure, will determine the curvature of block 86. The block is normally a machined solid piece of material, such as aluminum or other appropriate metal, but can be a polymeric resin, if desired. Machined surface 90 is provided on the block, to which fiber 84 is attached. The radius of curvature should be between 5 and 8 centimeters, preferably about 6 centimeters, but can vary depending upon the fiber being used. The diameter of the fiber is a factor in determining the arc, since the lapping procedures in accordance with the present invention are to be performed very precisely. That is, the surfaces provided by the lapping should be as flat as possible, in order to assure a good optical contact. If too much curvature, in relation to the fiber diameter, is utilized it is possible to break the fiber. However, it is also desirable to maximize the surface area of the smaller or launch fiber, and thus a larger radius of curvature, due to lapping procedure, would result in a larger surface area. Thus, in manufacture the selected curvatures would depend upon the particular fibers utilized, and the radius of curvature would be selected in order to maximize optical transmission without incurring production problems. It is preferable to use as small a radius as possible, but the larger fibers require a large radius in order to avoid the above problems.

As shown in FIG. 3, epoxy 88 is applied and cured to attach fiber 84 to surface 90. The epoxy resins utilized are conventional epoxies which cure by admixture of an epoxide crosslinking agent with a resin or polymer which contains hydroxyl or other cross-linking groups in the molecular chain. The resulting reaction cures the mixture and forms a hard, clear, adhesive layer. Depending upon the particular use, it is possible to add a coloring agent to the epoxy resin prior to or during mixture with the crosslinking agent in order to provide for light absorption etc. In addition, it has been found that the inclusion of glass particles in the epoxy prior to curing is of significant advantage. During the lapping step, an ordinary epoxy resin would be softer than the glass fiber and thus would be lapped away from the surface at a higher rate. The result would be a relief type of structure where the glass fiber would stick out above the epoxy. For purposes of manual mechanical alignment, this relief structure would be advantageous; however, in the automated process herein, the relief structure could produce problems such as chipping of the glass fiber etc. Therefore, it has been found that the addition of the glass particle filler, which results in a reinforced epoxy having approximately the same hardness as that of the glass fiber, is of great advantage. The result is that in the lapping process, the epoxy is removed at the same rate as the glass cladding and glass core, and thus an even, smooth, flat surface is produced by the lapping.

When glass beads are added to the epoxy composition they should be sized so that the particles are not larger than the diameter of the launch fiber. They may be included in the epoxy in bead diameter down to as small as 0.001 millimeter and may be present in amounts up to about 20%, preferably about 5 to 10%, by weight of the epoxy mixture.

Figure 4:
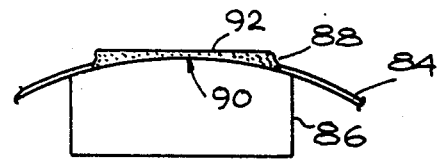
FIG. 4 is a side view of a lapped and polished fiber.

The lapping is effected, for example, by the use of 5 micron abrasive alumina powder in a water or an oil slurry. Lapping procedures are standard in the art, and upon occassion, it is appropriate to use finer alumina, or other powder. However, the particular powder used, after being selected as appropriate for the size fiber, is not critical. The resulting lapped structure is shown in FIG. 4, wherein fiber 84 is mounted on aluminum block 86 along surface 90 thereof, but in this figure, cured epoxy resin 88 and the fiber have been lapped to produce a flat surface 92.

Figure 5:
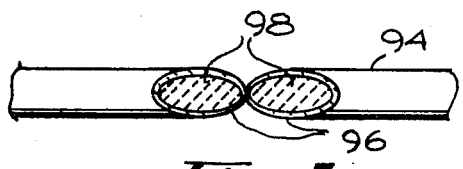
FIG. 5 is a plan view of a lapped and polished launch fiber without the mounting block.

The lapped fiber, which forms the launch fiber in the product of the present invention, is shown in FIG. 5. Fiber 94 has been lapped, after mounting on the arcuate surface as in FIG. 4 to produce elliptical flat surfaces 96 and 98. Surface 96 is the outside cladding of the glass-clad glass fiber, and elliptical surface 98 is the core of the fiber. It should be noted that the surface is planar, and that it is surrounded by the cured epoxy resin. It should be further noted that the points of the two ellipsoids 98 come into contact; that is, the lapping is continued until the central core of the fiber is completely severed and, preferably, only this far.

Figure 6:
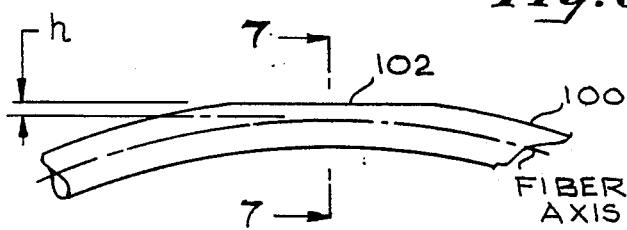
FIG. 6 is a side view of a lapped and polished throughput fiber without the mounting block.

In FIG. 6, a side view of the throughput or larger fiber in accordance with the present invention is shown. In this particular drawing, the epoxy resin and the arcuate mounting surface have been eliminated for purposes of illustration. In the figure, fiber 100 has been lapped to produce horizontal flat surface 102 which is at a distance h from the center line of the fiber axis. It should be noted that distance h should be positive, in order to maximize throughput capacity of the throughput fiber. That is, less than half of the thickness of the fiber should be removed in order to minimize the amount of signal lost during throughput. In addition, the exposed core surface area produced by the lapping of fiber 100 should be equal to one of the exposed core surface areas 98 (FIG. 5) in order to maximize throughput, and maximize launch.

Figure 7:
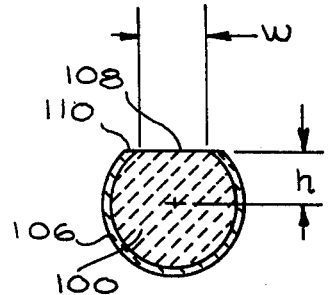
FIG. 7 is an end view of a section taken along lines 7—7 of FIG. 6.

FIG. 7 shows a detail of the launch fiber taken alone line 7—7 of FIG. 6. In FIG. 7 the glass cladding is shown as 106. It should be noted that both the fiber and cladding have been lapped to form flat surfaces 108 and 110, respectively. They produce a flattened core surface of width W. This width would correspond to the width of the core exposed in FIG. 5, which is the diameter of the launch fiber. Once width W and the width of, or diameter of, the launch fiber, along with the arcs to be utilized in the mandrels, have been determined, mathematical calculations may be effected in order to determine the specific cross-sectional areas, and thus the amount of lapping necessary.

Figure 8:
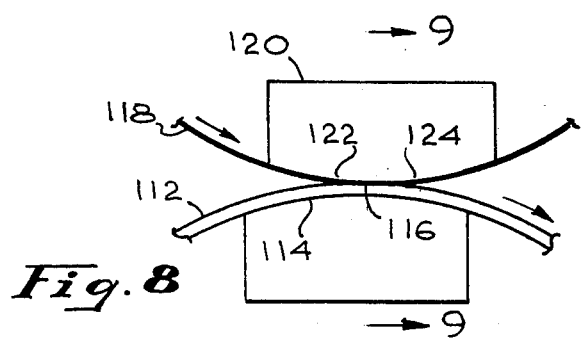
FIG. 8 is a side view of the mounted coupler of the present invention.

After lapping, and while still mounted on the aluminum blocks, the units are mated together in the form shown in FIG. 8. In this form, th oughput fiber 112 is retained on arcuate surface 114, and has a flat surface 116 produced by lapping the cured epoxy adhesive (not shown). Launch fiber 118 is mounted on block 120, and has flat surfaces 122 and 124. Flat surface 124 is not mounted in contact with flat surface 116 of throughput fiber 112, but flat surface 122 is mounted such that surfaces 116 and 122 completely mate. The result is that a minimum amount of material has been removed from fiber 112, and thus throughput capacity is very high; in the alternative, all of the material has been removed from fiber 118, and as a result signals traveling through fiber 118 in the direction shown by the arrow will be almost completely transferred to fiber 112, and exit in the direction of the arrow on fiber 112.

Alignment of the materials is of great importance in order to maximize light transfer between the two fibers. It should be noted that, in any event, radii defined by the arcs of the fibers and passing through the center point of the lapping step on each fiber will be offset from each other when the unit is completed. That is, the center point on the launch fiber would be the point where the two launch core sections shown in FIG. 5 come together, and this would be adjacent to the end, not the center, of the core section produced by lapping of the throughput fiber. Thus there would be an offset of an amount determined by the arcs, the fiber diameters and flat lapped surface areas used.

Figure 9:
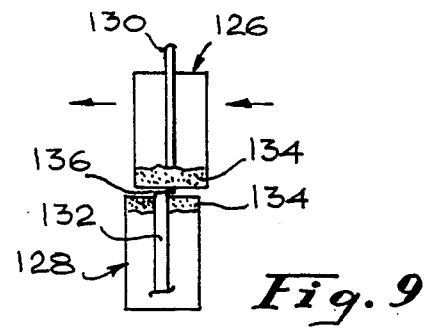
FIG. 9 is an end view of the coupling during mounting.

In FIG. 9, a partial section taken along line 9—9 of FIG. 8 is shown. The offset at the center is adjusted as shown in FIG. 8 to compensate for the above referenced center point alignment characteristics. As shown in FIG. 9, block 126 is not totally aligned with block 128, and the arrows show the direction motion is needed for alignment. Launch fiber 130 is to be centered over throughput fiber 132 in this direction, so that the sides of the elliptical surfaces produced by the full cutting of the core in the launch fiber match with the sides of the core section produced by the lapping of the throughput fiber. In this light, the epoxy adhesive is shown as 134 in both cases, and area of fiber contact is shown as 136. When the two fibers are vertically aligned, then at least half of the match-up of the surface areas, as noted above, is completed. The other half of the matching is the longitudinal alignment wherein the intersection of the two severed core sections shown in FIG. 5 matches with the end of the lapped core section shown in FIGS. 6 and 7.

It should be noted that on the launch fiber, it is very often quite hard to prevent lapping through both the core and the cladding because of the very small diameters thereof. The preferred form, of course, is merely to lap through the core of the launch fiber, and leave the cladding extant in a very small area. However, as a practical matter, lapping into the cladding section can be tolerated. Additionally, in order to enlarge the surface area of the lapped surface of the launch fiber, a large base radius of curvature is used. This, of course, results in a smaller angle of entry, that is the light as it exits the launch fiber is travelling in almost the identical direction as the light within the throughput fiber and this characteristic further improves coupling. After matching up the fibers, the epoxy is again applied with its cross-linking agent mixed therein and allowed to cure. This sets the bond between the two surfaces, and holds them in a fixed, closely aligned, contacting relationship. An apparatus for and method of aligning the fibers are described in applicants' copending application Ser. No. 123,035 filed concurrently herewith and entitled OPTICAL FIBER MATING APPARATUS AND METHOD.

EXAMPLE

A launch coupler was prepared in accordance with the present invention utilizing Galite 3,000 small and Galite 3,000 LC fibers. "Galite" is believed to be a registered trademark of Galileo Electro-Optics, Inc.

The small fiber has a core diameter of 68 microns, and the LC (large core) fiber has a diameter of 125 microns. Both were mounted on 2.4 inch radius aluminum bases and attached thereto utilizing a standard two part (resin and cross-linking agent) clear epoxy adhesive. Both were then lapped utilizing 5 micron alumina powder in a water slurry. The lapping was done until the throughput fiber had an exposed core length of approximately 120 mils, and the launch fiber had an exposed core length of approximately 110 mils. The surfaces were matched up utilizing a microscope after positioning as closely as possible through sight and feel. They were then further positioned by the introduction of infrared light into the fibers, sensing output and adjusting the position of the fibers for maximum output. After another layer of epoxy resin had been prepared and applied to the positioned fibers, the epoxy was allowed to cure and the unit was tested. The results were the production of a launch coupler having a loss of 0.01dB corresponding to a loss of approximately 0.23% of the signal transmitted. The launch coupling insertion loss was approximately 1.5dB or 29% of the signal.

Although there have been described above several specific arrangements for the production of launch couplers in accordance with the invention for the purpose of illustrating the manner in which the invention may be used to advantage, it will be appreciated that the invention is not limited thereto. For example, although the invention has been disclosed in the context of glass-clad glass fibers, fibers of different cladding may be utilized, without the principles of the present invention being rendered inapplicable. Accordingly, any and all modifications, variations or equivalent arrangements which may occur to those skilled in the art should be considered to be within the scope of the invention as defined by the annexed claims.

What is claimed is:

1. A fiber optic coupler comprising a curved throughput fiber having a longitudinal planar surface and a curved launch fiber having two longitudinal planar surfaces exposing the severed core of the launch fiber, the ratio of the diameter of the throughput fiber to the diameter of the launch fiber being from 3:2 to 4:1 and said throughput fiber being joined to only one of the launch fiber planar surfaces.

2. The coupler of claim 1 wherein the ratio is from 1.6:1 to 2.4:1.

3. The coupler of claim 1 wherein the throughput fiber core diameter is from 100 to 400 microns, and the launch fiber core diameter is up to 100 microns.

4. The coupler of claim 3 wherein said throughput core diameter is from 125 to 250 microns and said launch core diameter is from 5 to 70 microns.

5. The coupler of claim 1 wherein each of said fibers adheres to an arcuate surface, and the fibers are adhered together by a coating surrounding the junction thereof.

6. The coupler of claim 1 wherein said fibers are monofilament glass-clad glass fibers.

7. The coupler of claim 6 wherein the width of the planar surface on the throughput fiber is substantially the diameter of the launch fiber.

8. The coupler of claim 1 wherein the launch fiber is a glass-clad glass fiber, the longitudinal planar surfaces are elliptical and the core is severed.

9. The coupler of claim 8 wherein the glass cladding of the launch fiber remains at least partly intact.

10. The coupler of claim 1 wherein the planar surface of the launch fiber contains two elliptical surfaces, the planar surface of the throughput fiber is elliptical, the elliptical surfaces are substantially of the same area and one of the launch fiber surfaces is overlapped with the throughput fiber surface.

11. The method of manufacturing fiber optic couplers comprising:
   bonding a first glass fiber to a first arcuate surface;
   bonding a second glass fiber to a second arcuate surface, the second fiber being substantially smaller in diameter than the first fiber;
   lapping each of said bonded fibers, individually, along said arcuate surfaces to expose a planar, substantially elliptical surface on said first fiber and a pair of planar, substantially elliptical surfaces on said second fiber, the lapping of the first fiber removing less than half the thickness of the fiber core;
   positioning one of said elliptical surfaces on said second fiber adjacent said elliptical surface on the first fiber, the surface areas of the adjacent elliptical surfaces being substantially equal; and
   coating the fibers with an adhesive to adhere and join the surfaces together.

12. The method of claim 11 further comprising bonding the fibers to the arcuate surface by utilizing a curable epoxy resin mixed with glass beads.

13. The method of claim 12 wherein the planar surfaces are provided by lapping the resin and fiber with an alumina slurry to produce the planar surfaces.

14. The method of claim 12 wherein the glass beads are of a diameter equal to or less than the core diameter of the optical fiber to be lapped.

15. The improvement of claim 14 wherein said glass beads are up to 5 microns in diameter.

16. The method of claim 11 further comprising utilizing monofilament optical fibers wherein the ratio of the diameter of the first fiber to the diameter of second fiber is from 3:2 to 4:1 and the width of the planar surface on the first fiber substantially equals the diameter of the second fiber.

17. The method of claim 16, further comprising selecting glass-clad monofilament glass fibers for the first and second fibers.

18. The method of claim 17 further comprising banding the monofilament fibers by utilizing a curable epoxy resin containing glass beads, and lapping the resin and the fibers to produce the surfaces.

19. The method of claim 18 further comprising lapping the second fiber in amount sufficient to sever the core thereof.

20. The method of claim 19 further comprising terminating the lapping procedures on the second fiber before complete severance of the glass cladding.

21. The method of claim 11 wherein said fibers are bonded together through the use of an optically transparent epoxy resin.

22. A method of manufacturing a fiber optic launch coupler comprising:
   positioning and bonding a throughput monofilament clad glass fiber on a first arcuate surface;
   positioning and bonding a launch monofilament fiber optic clad glass fiber on a second arcuate surface, the launch fiber being substantially smaller in diameter than the throughput fiber;
   lapping the throughput fiber through said bonding material and the cladding of said fiber and exposing a portion of the core thereof with less than half the thickness of the fiber being removed;

lapping the launch fiber through said bonding material, through the cladding thereof, and through the core thereof on said arcuate surface and producing a flat surface chordal to the arc of the fiber comprising two elliptical sections of the core of said launch fiber, the surface area of one of the elliptical sections of said launch fiber core being substantially equal to the surface area of the core exposed in the throughput fiber;

positioning one of the launch surfaces and the throughput core surface in a mating relationship; and bonding said surfaces in said mating relationship.

23. The method of claim 22 wherein the ratio of the core diameter of the throughput fiber to the core diameter of the launch fiber is from 1.6:1 to 2.4:1.

24. The method of claim 22 wherein the throughput fiber core diameter is from 100 to 400 microns, and the launch fiber core diameter is up to 100 microns.

25. The method of claim 24 wherein said throughput core diameter is from 125 to 250 microns and said launch core diameter is from 5 to 70 microns.

26. A fiber optic coupler comprising:
a throughput fiber having a lapped planar surface; and
a launch fiber having a pair of planar surfaces formed by lapping entirely through the core of the launch fiber, the ratio of the diameter of the throughput fiber to the diameter of the launch fiber being from 3:2 to 4:1, said fibers being curved and in contact along the planar surface of the throughput fiber and only one of the planar surfaces of the launch fiber, said contacting surfaces being aligned along the curvature of the fibers, wherein the width of the planar surface on the throughput fiber is equal to the core diameter of the launch fiber.

* * * * *